(12) United States Patent
Chen et al.

(10) Patent No.: US 12,473,799 B2
(45) Date of Patent: Nov. 18, 2025

(54) SYSTEMS AND METHODS FOR WIRELESS TRANSMISSION OF POWER IN DEEP SUBSURFACE MONITORING

(71) Applicant: University of Houston System, Houston, TX (US)

(72) Inventors: Jiefu Chen, Cypress, TX (US); Xiaonan Shan, Sugar Land, TX (US); Miao Pan, Houston, TX (US); Yong Wei, Hubei (CN)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 118 days.

(21) Appl. No.: 17/764,656

(22) PCT Filed: Nov. 20, 2020

(86) PCT No.: PCT/US2020/061521
§ 371 (c)(1),
(2) Date: Mar. 29, 2022

(87) PCT Pub. No.: WO2021/102270
PCT Pub. Date: May 27, 2021

(65) Prior Publication Data
US 2022/0341295 A1     Oct. 27, 2022

Related U.S. Application Data

(60) Provisional application No. 62/938,601, filed on Nov. 21, 2019.

(51) Int. Cl.
*E21B 47/13*     (2012.01)
*E21B 41/00*     (2006.01)
(Continued)

(52) U.S. Cl.
CPC ...... *E21B 41/0085* (2013.01); *E21B 41/0064* (2013.01); *E21B 47/13* (2020.05);
(Continued)

(58) Field of Classification Search
None
See application file for complete search history.

(56) References Cited

U.S. PATENT DOCUMENTS 4,057,781 A * 11/1977 Scherbatskoy ......... E21B 47/13
340/854.6
4,839,644 A * 6/1989 Safinya ................... E21B 47/13
340/854.6

(Continued)

FOREIGN PATENT DOCUMENTS

| WO | WO-2009129143 A1 * | 10/2009 | .............. C10G 21/22 |
| WO | WO-2016159931 A1 * | 10/2016 | .............. E21B 17/02 |
| WO | WO-2020025667 A1 * | 2/2020 | .............. E21B 47/01 |

OTHER PUBLICATIONS

WO-2020025667-A1 English Language Translation (Year: 2020).*
(Continued)

*Primary Examiner* — Curtis A Kuntz
*Assistant Examiner* — Jerold B Murphy
(74) *Attorney, Agent, or Firm* — George Likourezos; Carter, DeLuca & Farrell LLP

(57) ABSTRACT

A system for wireless transmission of power in deep subsurface monitoring includes a casing, an oscillating current source configured to energize the casing, and a wireless telemetry module disposed on the casing. The wireless telemetry module includes a shell, a toroidal antenna disposed within the shell and configured to collect electrical energy from the energized casing, a telemetry transceiver control unit disposed within the shell, a battery pack disposed within the shell, a downhole signal acquisition unit disposed within the shell, and a sensor interface disposed (Continued)

within the shell. The battery pack is configured to store the collected electrical energy. The telemetry transceiver control unit is configured to generate a binary code to drive the toroidal antenna.

16 Claims, 14 Drawing Sheets

(51) Int. Cl.
    *G01V 3/28*     (2006.01)
    *H02J 50/00*     (2016.01)
    *H02J 50/23*     (2016.01)
    *H02J 50/27*     (2016.01)

(52) U.S. Cl.
    CPC .............. *G01V 3/28* (2013.01); *H02J 50/005* (2020.01); *H02J 50/23* (2016.02); *H02J 50/27* (2016.02)

(56) References Cited

U.S. PATENT DOCUMENTS

| | | | |
|---|---|---|---|
| 4,933,640 A * | 6/1990 | Kuckes | E21B 47/0228 175/45 |
| 11,073,014 B2 * | 7/2021 | Pihl | H01F 38/14 |
| 11,339,648 B2 * | 5/2022 | Joshi | E21B 47/12 |
| 2010/0194587 A1 | 8/2010 | Weerasinghe | |
| 2012/0256759 A1 | 10/2012 | Petrovic et al. | |
| 2015/0107824 A1 * | 4/2015 | Signorelli | E21B 41/0085 166/244.1 |
| 2016/0258274 A1 * | 9/2016 | Bittar | E21B 47/0228 |
| 2017/0204724 A1 | 7/2017 | Godager et al. | |
| 2017/0254183 A1 | 9/2017 | Vasques et al. | |
| 2017/0356274 A1 * | 12/2017 | Thompson | E21B 43/14 |

OTHER PUBLICATIONS

International Search Report and Written Opinion issued by the International Searching Authority in connection with International Application No. PCT/US2020/061521 dated Feb. 10, 2021.

International Preliminary Report on Patentability issued by the International Bureau of WIPO in connection with International Application No. PCT/US2020/061521, dated May 17, 2022.

Examination Report received from the Canadian Patent Office in connection with International Application No. 3,152,442, dated Oct. 12, 2023.

Canadian Examination Report issued by the Canadian Patent Office in connection with International Application No. 3,152,442, dated Aug. 26, 2024.

\* cited by examiner

SYSTEMS AND METHODS FOR WIRELESS TRANSMISSION OF POWER IN DEEP SUBSURFACE MONITORING

CROSS REFERENCE TO RELATED APPLICATION

This application claims the benefit of and priority to U.S. National Stage Application of PCT Application Serial No. PCT/US2020/061521, filed Nov. 20, 2020 and U.S. Provisional Patent Application Ser. No. 62/938,601, filed on Nov. 21, 2019, the entire contents of which are incorporated by reference herein.

BACKGROUND

Carbon capture and storage (CCS) is a key technological approach to slow down atmospheric $CO_2$ accumulation and marine $CO_2$ accumulation and mitigate the global climate and environmental change. CCS is a process to separate and capture $CO_2$ from power stations or industrial plant effluents and inject the captured $CO_2$ into an underground geological formation to permanently store $CO_2$.

The sequestrated $CO_2$ needs to be safely stored in the underground geological structure for at least thousands of years. Leakage could occur during or after $CO_2$ underground injection. Therefore, measuring and detection of $CO_2$ leaks at sequestration sites are extremely important. Placement of sensors in direct contact with the reservoir will provide real-time and high-resolution geophysical and geochemical information of a $CO_2$ reservoir. Building a robust system for transmitting monitoring data from deep subsurface to surface, also called telemetry, is quite challenging.

Currently, the deep subsurface monitoring data are sent to the surface via an umbilical cable placed either inside or outside of the well casing. For example, an umbilical cable inside of the casing requires perforations on the casing which impairs well integrity; on the other hand, the umbilical running up the outside of the casing in the cement annulus can potentially be a pathway for $CO_2$ leakage.

Thus, developments efficiently transmitting power in deep subsurface monitoring are needed.

TECHNICAL FIELD

The present disclosure relates to wireless telemetry and power transfer system in deep subsurface monitoring. More specifically, the present disclosure relates to the use of an array of toroidal transceivers deployed winding around the highly conductive casing for wireless data transfer between the surface and the deep subsurface, and the use of an energized casing technique to charge the toroidal transceivers and subsurface sensors from the surface in a wireless fashion.

SUMMARY

Aspects of the present disclosure are described in detail with reference to the drawings wherein like reference numerals identify similar or identical elements.

An aspect of the present disclosure provides a system for wireless transmission of power in deep subsurface monitoring. The system includes a casing made of a conductive surface, an oscillating current source configured to energize a casing, and a wireless telemetry module disposed on the casing. The wireless telemetry module includes a shell, a toroidal antenna disposed within the shell, and a battery pack disposed within the shell The battery pack is configured to store the collected electrical energy. The toroidal antenna is configured to collect electrical energy from the energized casing.

In another aspect of the disclosure, the wireless telemetry module may be located in a subsurface.

In a further aspect of the disclosure, the wireless telemetry module may be located in a $CO_2$ reservoir.

In an aspect of the present disclosure, the wireless telemetry module may further include a telemetry transceiver control unit configured to generate a binary code to drive the antenna.

In another aspect of the present disclosure, the antenna may include a toroidal antenna.

In yet another aspect of the present disclosure, the system may further include a temperature sensor, a pressure sensor, and/or a $CO_2$ sensor.

In a further aspect of the present disclosure, the wireless telemetry module may further include a downhole signal acquisition assembly disposed within the shell. The downhole signal acquisition assembly may be configured to collect a downhole temperature, pressure, and/or $CO_2$ concentration.

In yet a further aspect of the present disclosure, the battery pack may include supercapacitors.

In accordance with aspects of the disclosure, a method for wireless transmission of power is presented. The method includes energizing a casing, obtaining by a toroidal antenna of a wireless telemetry module disposed on the casing an electrical energy from the energized casing, determining whether there is an electrical charge on the toroidal antenna, and charging a battery pack based on the obtained electrical energy.

In an aspect of the present disclosure, the method may further include determining if the battery pack is fully charged and wirelessly transmitting a signal indicating that the battery pack is fully charged based on the determination.

In another aspect of the present disclosure, the energizing may be based on an oscillating current source.

In yet another aspect of the present disclosure, the wireless telemetry module may be located at a subsurface.

In a further aspect of the present disclosure, the wireless telemetry module may be located in a $CO_2$ reservoir.

In yet a further aspect of the present disclosure, the method may further include generating a binary code to drive the antenna.

In an aspect of the present disclosure, the antenna may include a toroidal antenna.

In another aspect of the present disclosure, the at least one wireless telemetry module includes a temperature sensor, a pressure sensor, and/or a $CO_2$ sensor.

In yet another aspect of the present disclosure, the method may further include collecting a downhole temperature, pressure, and/or $CO_2$ concentration based on the temperature sensor, the pressure sensor, and/or the $CO_2$ sensor.

In accordance with aspects of the disclosure, a system for wireless transmission of power in deep subsurface monitoring includes a casing including a conductive material, an oscillating current source configured to energize the casing, and a wireless telemetry module. The wireless telemetry module includes an antenna, a battery pack, a processor, and a memory. The memory includes instructions stored thereon, which when executed by the processor, cause the system to: energize a surface of the casing, obtain by the antenna electrical energy from an energized surface of the casing, determine whether there is an electrical charge on the antenna, and based on the determination, charge the battery pack using the obtained electrical energy.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

DETAILED DESCRIPTION

Figure 1:
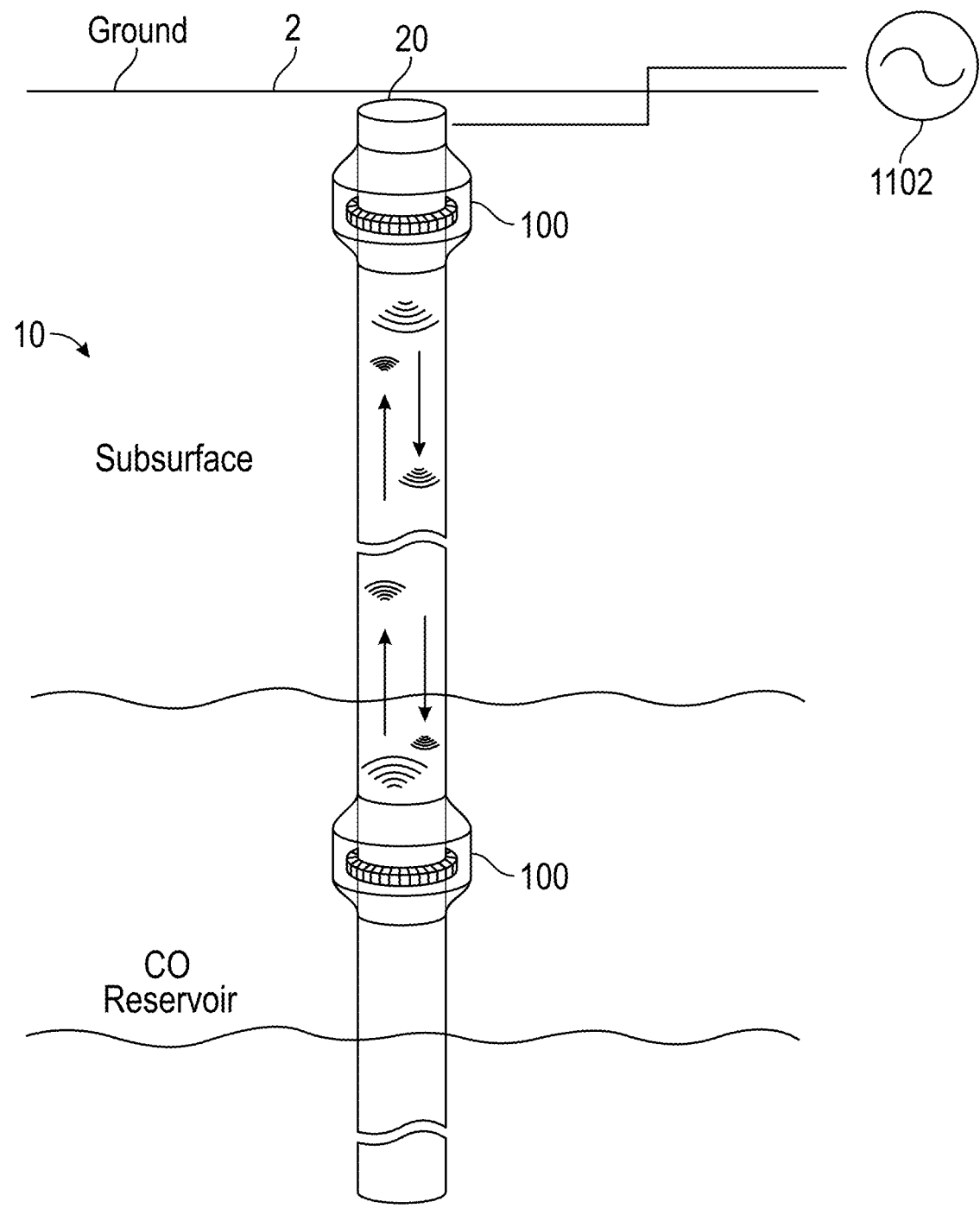
FIG. 1 is a diagram of wireless data transfer using a wireless telemetry unit within the subsurface and on the surface, in accordance with the present disclosure.

This disclosure relates to systems and methods for wireless telemetry and power transfer. More specifically, an aspect of the present disclosure provides a system for wireless telemetry and power transfer in deep subsurface monitoring.

Although the present disclosure will be described in terms of specific aspects, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

A reliable and cost-effective wireless telemetry system using electromagnetic waves for real-time subsurface monitoring (e.g., $CO_2$ sequestration) is disclosed. An array of toroidal transceivers is deployed winding around a highly conductive casing for wireless data transfer between the surface and deep subsurface, and an energized casing technique is utilized to charge the toroidal transceivers and subsurface sensors. This novel wireless telemetry system will help to maintain well integrity and reduce potential leakage by eliminating the need for perforated casing or an umbilical in the cement annulus since no direct path of fluid (e.g., oil, gas, underground water, $CO_2$) leakage is induced by this wireless system. This approach has two elements. First, develop a reliable and cost-effective wireless telemetry system for real-time data transmission of meaningful measurements from deep subsurface to the surface and from the surface to deep subsurface. Second, develop a wireless power transfer system to charge the downhole antennas and subsurface sensors using energized casing. This system can also be used to operate downhole well equipment, including sensing, control, and telemetry devices.

Briefly, the present disclosure provides a new and improved system for wireless transmission of power through a well casing to downhole electrical equipment mounted with the casing in a wellbore or other subsurface formation. The system includes several transceivers that can transfer data between surface and deep subsurface by using toroidal coils sending and receiving an electromagnetic signal. The system also includes modules for wireless power transfer from the surface to downhole sensors and transducers.

The present disclosure provides a new and improved method of wireless transmission of power through a casing to downhole electrical equipment mounted with the casing in a wellbore. With the present disclosure, the casing is energized at the surface by a strong oscillating current source, e.g., 100 A. Even though the current will decrease along the casing from the surface to the casing bottom due to current leakage into the surrounding conducting formation, a small current can still be transmitted to the casing bottom since the high conducting casing acts as good guidance for current flow. Using efficient energy harvesting devices, the toroidal transceivers and battery pack in the deep subsurface can be charged by even a very small percentage of the input power. The electrical energy stored in the battery pack can supply power to the downhole sensor acquisition system and transceiver systems for a long time, for example, for more than two years.

FIG. 1 is a diagram of wireless data transfer using wireless telemetry system 10 in the subsurface. A wireless telemetry system 10 generally includes a casing 20 made of a conductive material, an oscillating current source 1102, and one or more wireless telemetry units disposed on the casing. In aspects, the casing may have a conductive surface. The oscillating current source is configured to energize the casing.

In various aspects, the wireless telemetry module 100 can be sleeved on the casing 20 and buried underground along with the casing 20. Because the wireless telemetry module 100 is sealed around and powered by inside battery pack 106 (FIG. 3), the wireless telemetry module 100 can work in high temperature and pressure environment for a long time in the well. The wireless telemetry module 100 includes a toroidal antenna 108.

Figure 2:
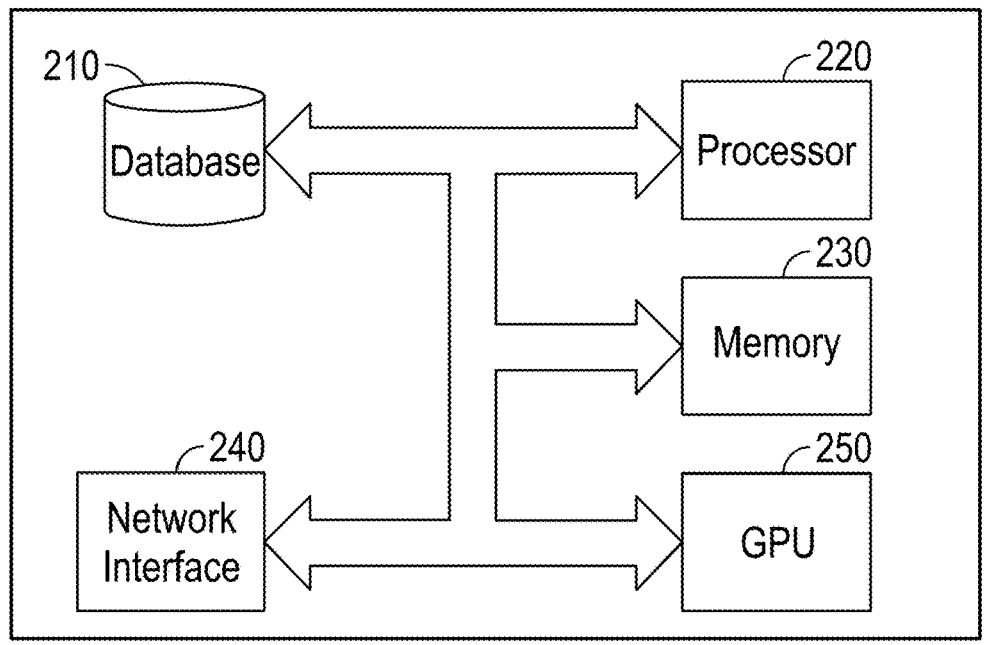
FIG. 2 is a diagram of a controller for use with the wireless telemetry unit of FIG. 1.

Referring now to FIG. 2, there is shown an illustration of exemplary components in the controller 200 (e.g., MCU) of FIG. 1, in accordance with aspects of the present disclosure. The controller 200 includes, for example, a database 210, one or more processors 220, at least one memory 230, and a network interface 240.

The database 210 can be located in storage. The term "storage" may refer to any device or material from which information may be capable of being accessed or reproduced or held in an electromagnetic or optical form for access by a computer processor. Storage may be, for example, volatile memory such as RAM, non-volatile memory, which permanently hold digital data until purposely erased, such as flash memory, magnetic devices such as hard disk drives, and optical media such as a CD, DVD, Blu-ray disc, or the like.

In various aspects, data may be stored on the controller 200, including, for example, user-selected and/or created events, preferences, historical data, documents, and/or other data. The data can be stored in the server database 210 and sent via the system bus to the processor 220. As will be described in more detail later herein, the processor 220 executes various processes based on instructions that can be stored in the memory 230 and utilizing the data from the database 210.

Figure 3:
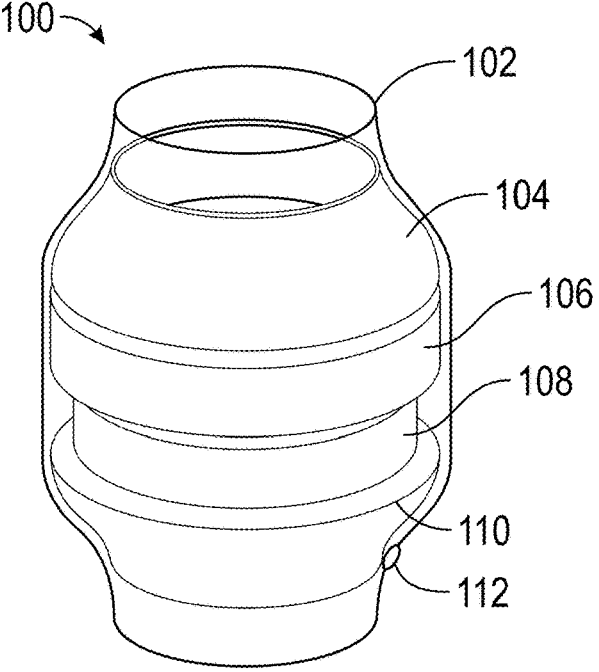
FIG. 3 is a diagram of a wireless telemetry unit in accordance with aspects of the present disclosure.
Figure 4:
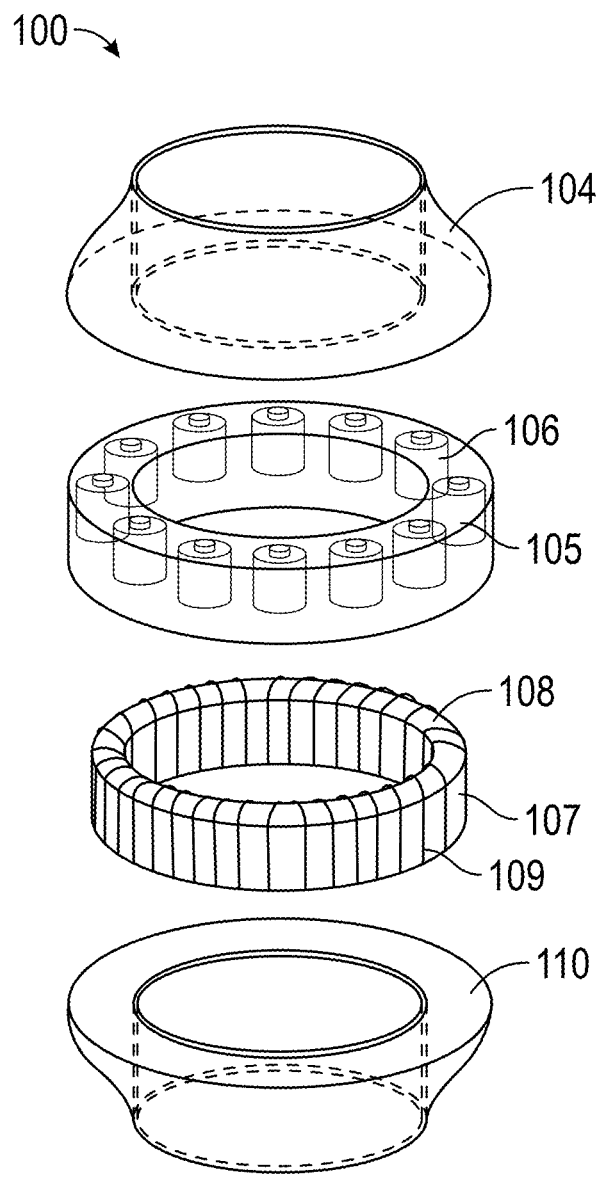
FIG. 4 is an exploded view of the wireless telemetry unit of FIG. 3.

As shown in FIGS. 3 and 4, the wireless telemetry module 100 includes a shell 102. Within the shell 102 is a telemetry transceiver control assembly 104, a battery pack 106 of supercapacitors 105, a toroidal antenna 108, a downhole signal acquisition assembly 110, and a sensor interface 112.

The shell 102 is configured to act as a sealing and waterproof layer for the toroidal antenna 108 to protect the internal components from potential damage. The connection between the downhole signal acquisition assembly 110 and an external sensor (e.g., sensors 1402, 1404, 1406, and 1408 of FIG. 14) may be made using the sensor interface 112. The sensor interface 112 may be sealed and pressure-resistant, which will ensure the integrity and tightness of the wireless telemetry module 100.

The toroidal antenna 108 includes a winding of loops of conductive wire 109 around a ring 107 of material with a high value of magnetic permeability such as ferrite or mu-metal. For example, in the uplink, the toroidal antenna 108 is used as the transmitting antenna and placed near subsurface sensors and winding around the outside of the casing. When working, the toroidal antenna 108 will stimulate electric currents in the casing. The current will gradually leak into the underground formation while flowing along the casing. The magnitude of the current will decrease when the current reaches the top of the casing. The highly conductive casing will act as guidance for current flow, which will significantly slow down the decay of the current signal. The signal will be picked up by the upper wireless telemetry module 100, which is winding around the casing at a location that is near the surface or by a voltmeter on the surface. The voltmeter will have two terminals. The first terminal is connected to the casing 20, while the second terminal is connected to the earth antenna as a metal stake driven into the ground with a certain distance away from the well.

The toroidal antenna 108 has at least three functions. First, the toroidal antenna 108 is used as a signal receiving antenna. Taking the downlink as an example, a toroidal antenna 108 (the receiving antenna) is placed near the subsurface sensors and winding around the outside of the casing. When there is a weak current passing along the casing 20, the toroidal antenna 108 can convert the current into a voltage signal and transmit to the telemetry transceiver control assembly 104. Second, the toroidal antenna 108 is used as a signal transmitting antenna. Taking the uplink, for example, a toroidal antenna 108 as the transmitting antenna is placed in the same place. When working, the toroidal antenna 108 will stimulate electric currents in the casing. The current-carrying information will gradually leak into underground formation while flowing along the casing. The magnitude of current will become relatively small when the current reaches the top of the casing 20, but the current can still be detectable near the surface since the highly conductive casing 20 forms guidance for current flow. Third, the casing 20 is used to collect electrical energy. When there is an alternating current on the casing 20, the toroidal antenna 108 can convert the current into a voltage, and supply the converted voltage to the charging assembly, and then charge the battery pack 106.

The battery pack 106 may include several high-temperature resistant supercapacitors 105 in parallel or other formation. Typically, the battery pack 106 may provide up to about two or more years of power for low-power circuits at full power. When the charging cycle comes, the battery pack 106 can be recharged by providing current through casing 20 on the ground.

The telemetry transceiver control assembly 104 has several functions. For example, the telemetry transceiver control assembly 104 can receive the electrical signal on the toroidal antenna 108 and convert the received electrical signal into a recognizable binary code so that the wireless telemetry module 100 may receive ground commands (e.g., commands to drive the toroidal antenna 108). In another example, the telemetry transceiver control assembly 104 can generate binary code to drive the toroidal antenna 108, thus playing the role of sending signals to the ground. In yet another example, the telemetry transceiver control assembly 104 can control the charging circuit to charge the battery pack 106.

The function of downhole signal acquisition assembly 110 is to collect downhole temperature, pressure, $CO_2$ concentration, and other information and record them in flash memory. By reducing the sampling frequency (such as 1 time/day), the power consumption of the system can be greatly reduced to ensure the longest possible working time.

Figure 5:
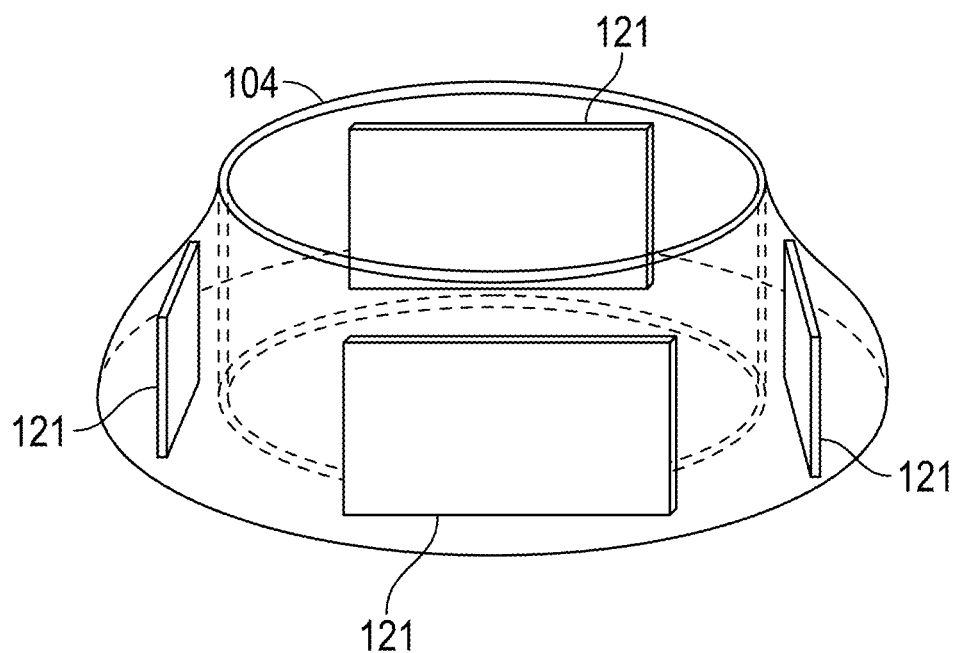
FIG. 5 is a diagram of a telemetry transceiver control assembly in accordance with aspects of the present disclosure.
Figure 6:
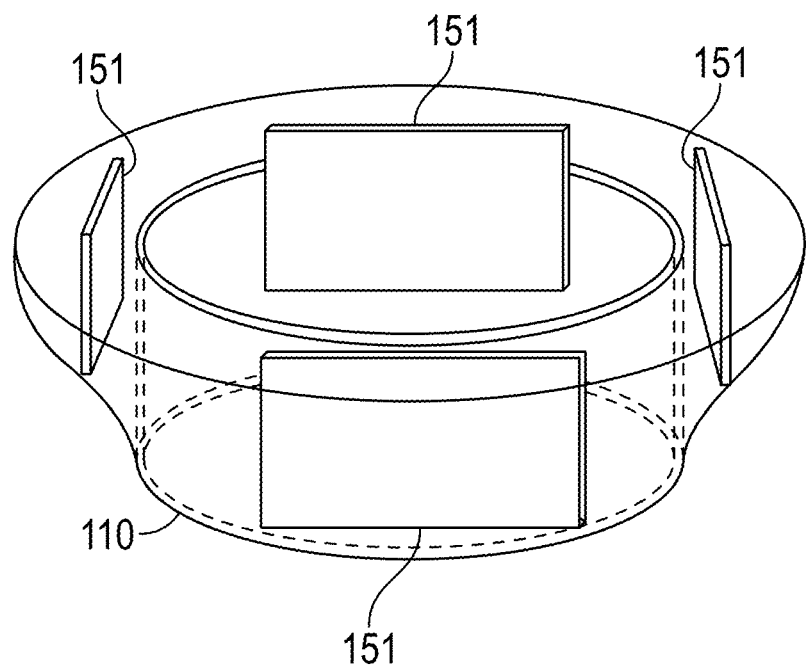
FIG. 6 is a diagram of a downhole signal sampling assembly in accordance with the present disclosure.

As shown in FIG. 5, several telemetry transceiver control circuit boards 121 are disposed in various locations within the telemetry transceiver assembly 104. An advantage of this design is that the design saves space. For example, to read data downhole, a computer that is configured for wireless communication may be placed on the ground, and the computer is connected to the wireless telemetry module 100, which is shallower near the ground. The computer sends a command to the subsurface, and the corresponding wireless telemetry module 100 will returns the corresponding data. As shown in FIG. 6, several downhole signal acquisition circuit boards 151 may be disposed in various locations within the downhole signal acquisition assembly 110.

FIG. 6 shows a predicted signal strength of the proposed wireless telemetry system 10. An oscillating current source (e.g., about 1 Ampere) at a working frequency (e.g., about 10 Hz to about 2 KHz) is used to drive the downhole toroidal antenna 108 (FIG. 1).

Figure 8:
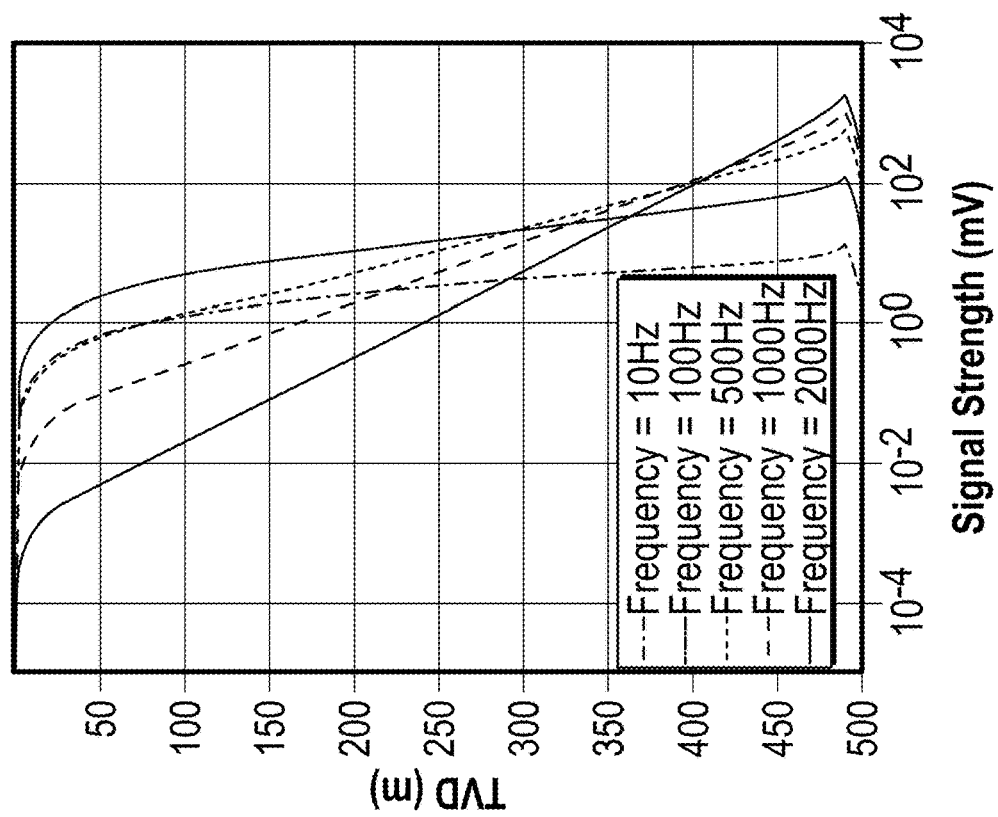
FIG. 8 is a graph of the signal strength along the casing at different working frequencies in accordance with aspects of the present disclosure.
Figure 7:
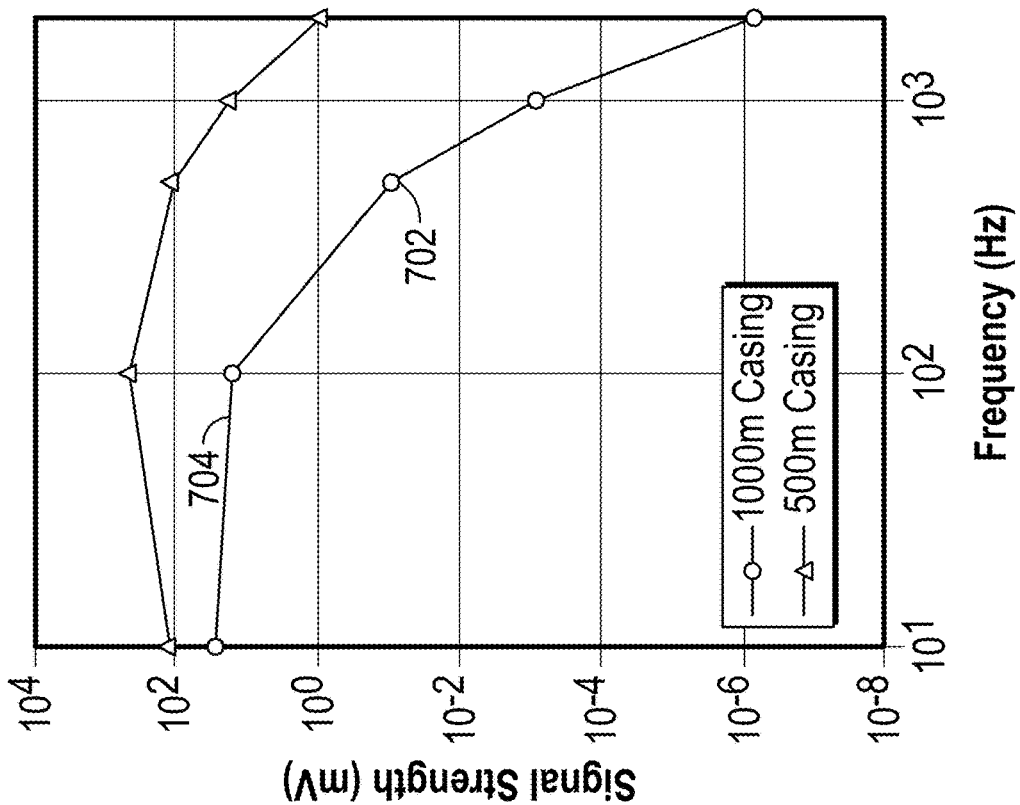
FIG. 7 is a graph of the estimated signal strength received on the surface in accordance with aspects of the present disclosure.

Referring to FIG. 7, a graph of received signal strength vs. frequency along a casing is shown. The graph includes a trace for a 1000-meter long casing 702 and a 500-meter long casing 704. As indicated by the 1000-meter long casing curve 702, the received signal on the surface will decrease as the working frequency gets higher. In this case, for example, a 1000-meter long vertical casing 20 surrounded by a homogenous 10 ohms-m underground formation would be assumed. As indicated by curve 704 for the 500-meter casing, the detected signal reaches its maxima at 100 Hz for a 500-meter long casing 20, which means a higher working frequency (hence, a higher data rate) may be used for monitoring of $CO_2$ reservoir with a shallower depth. FIG. 8 shows that the signal strength along the casing 20 decreases from the casing 20 bottom to the surface. Thus, the detected signal may be improved by connecting one terminal of the voltmeter to the casing 20 at some depth in the earth (e.g., about 10 meters to about 50 meters) instead of directly on the top of the casing 20. The simulated results are consistent with traditional electromagnetic telemetry used in oilfield drilling.

In aspects, a channel capacity (e.g., data rate) of the system 10 may be estimated based on the Shannon theorem, with the equation $C=B \log_2 (1+(S/N))$, where C is channel capacity, B is the bandwidth, and S/N is the signal to noise ratio. One of skill in the art would be familiar with the Shannon theorem and understand how to implement it. For example, if the noise level is assumed to be −70 dBm, and the transmitter current source is about 10 mA, then the channel capacity would be about 16.4 kbps. If the current source was about 100 mA, then the channel capacity would be about 24.5 kbps. If the current source was about 1 A, then the channel capacity would be about 32.7 kbps. That is, channel capacity may vary with transmitter current density.

Figure 9:
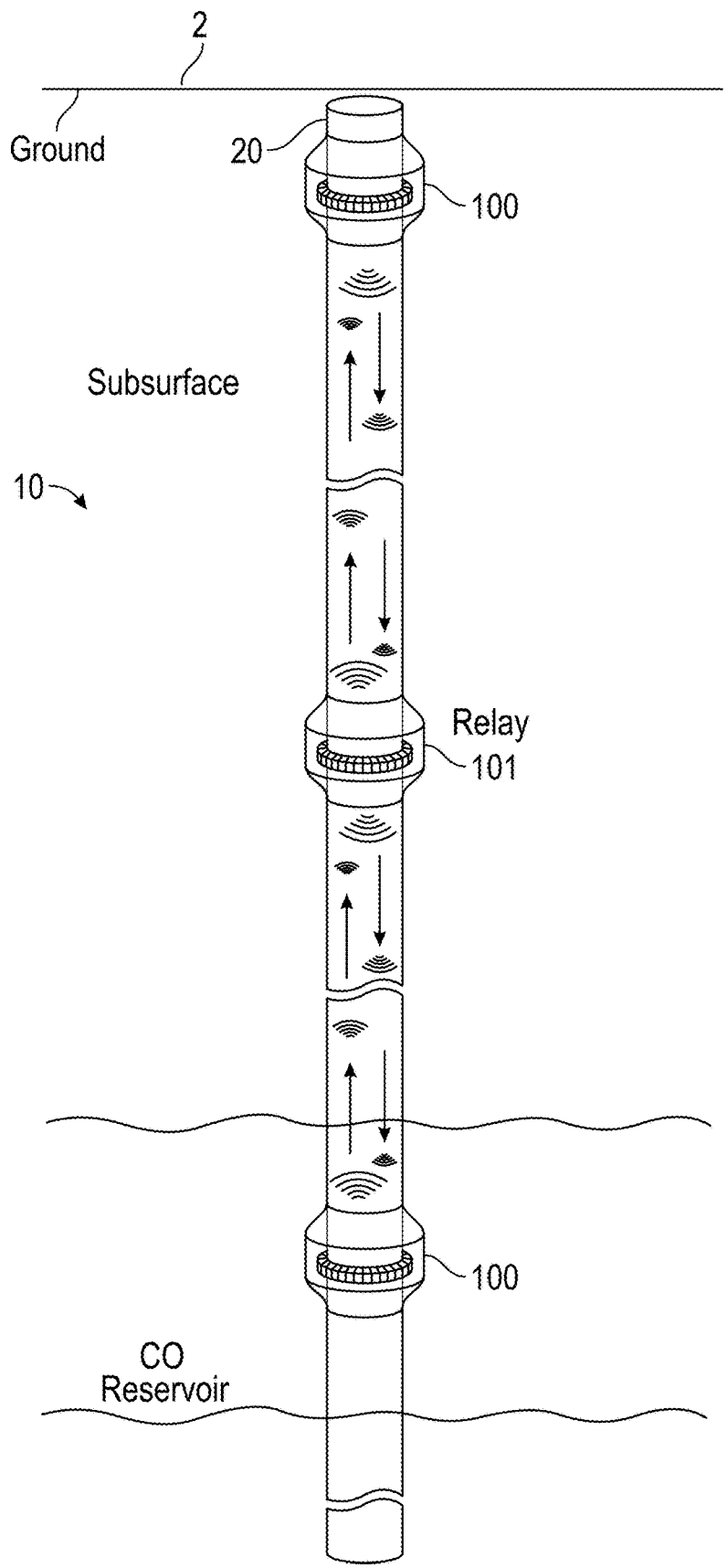
FIG. 9 is a diagram of a multi-hop wireless communication along a casing in accordance with aspects of the present disclosure.

As shown in FIG. 9, to enhance the detected signal at the surface and the data transmission rate for long-distance wireless communication in lossy media, the multi-hop wireless communication technique can be used with several relay antennas 101 (or repeaters) deployed along the long casing 20. A repeater is also a toroidal antenna 108 installed around the casing 20 to receive, amplify, and retransmit the signals to extend the transmission distance and ensure the required data transmission rate. Multi-hop wireless communication will help transmit data from deep subsurface to surface, or in the other direction, in lossy media with relatively heavy signal attenuations.

Figure 10:
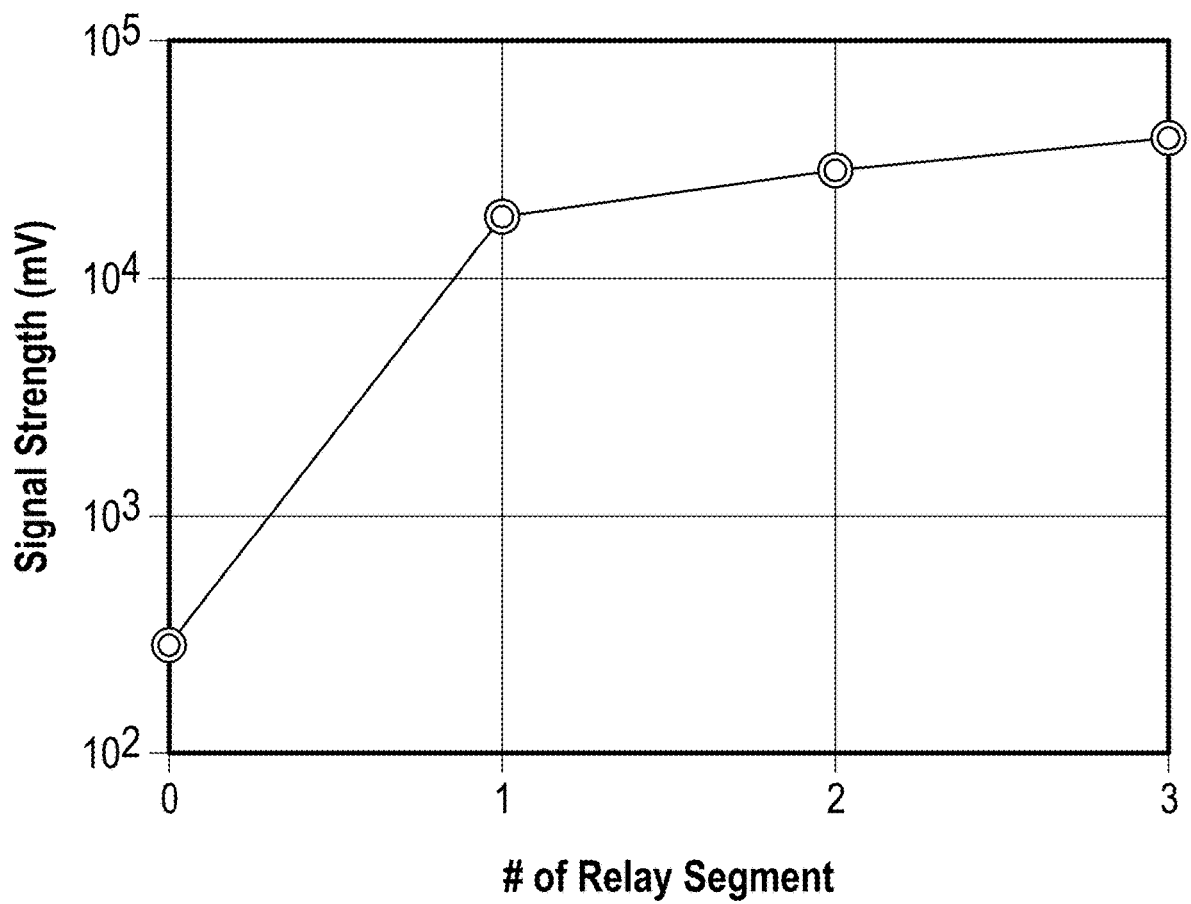
FIG. 10 is a graph of predicted signal strength vs. the number of relay segments in accordance with aspects of the present disclosure.

FIG. 10 shows a graph of signal strength versus a number of relay segments. The graph indicates that the signal strength, and correspondingly telemetry range, can be enhanced by adding more relay antennas 101 (FIG. 9) (i.e., repeaters) between the two ends of a casing 20.

Once the wireless telemetry system is deployed for monitoring, the toroidal transceivers and the sensors are permanently placed in a cement-filled annulus. Since no direct cable link exists between the surface and the downhole devices, a wireless power transfer system is necessary for long-time monitoring.

Figure 11:
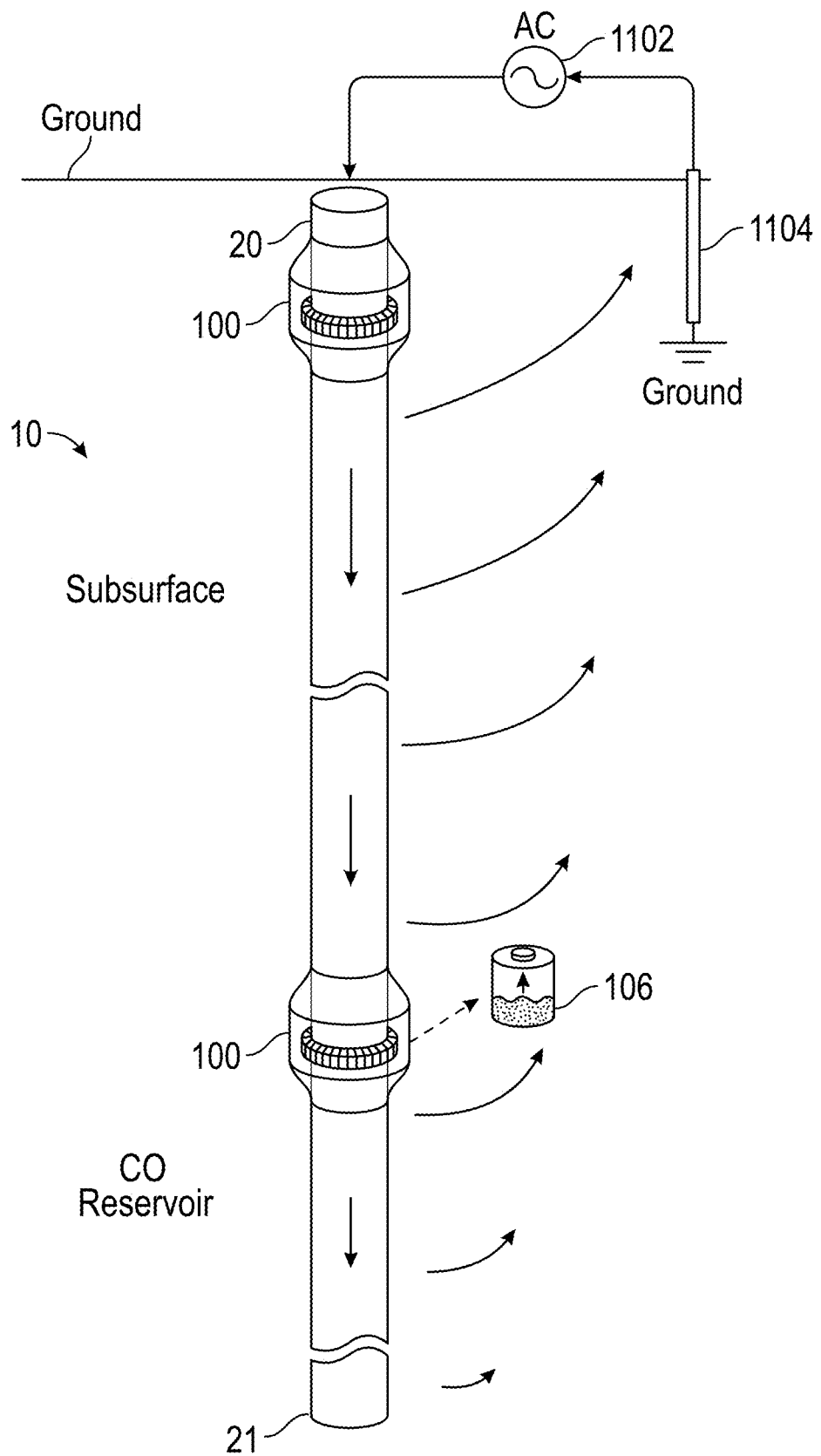
FIG. 11 is a diagram of wireless power transfer in accordance with aspects of the present disclosure.

FIG. 11 shows a diagram of wireless power transfer using an energized casing technique for wireless charging of the downhole battery pack 106. The casing 20 is energized at the surface by a strong oscillating current source from an AC source 1102. Even though the current will decrease along the casing 20 from the surface 2 to the casing 20 bottom 21 due to the current leakage into the surrounding conducting formation, a small current can still be transmitted to the casing bottom 21 since the highly conductive casing 20 acts as good guidance for current flow. Using efficient energy harvesting devices, the battery pack 106 in the deep subsurface can be charged even though a very small percentage of the input power is available near the casing 20 bottom.

Figure 12:
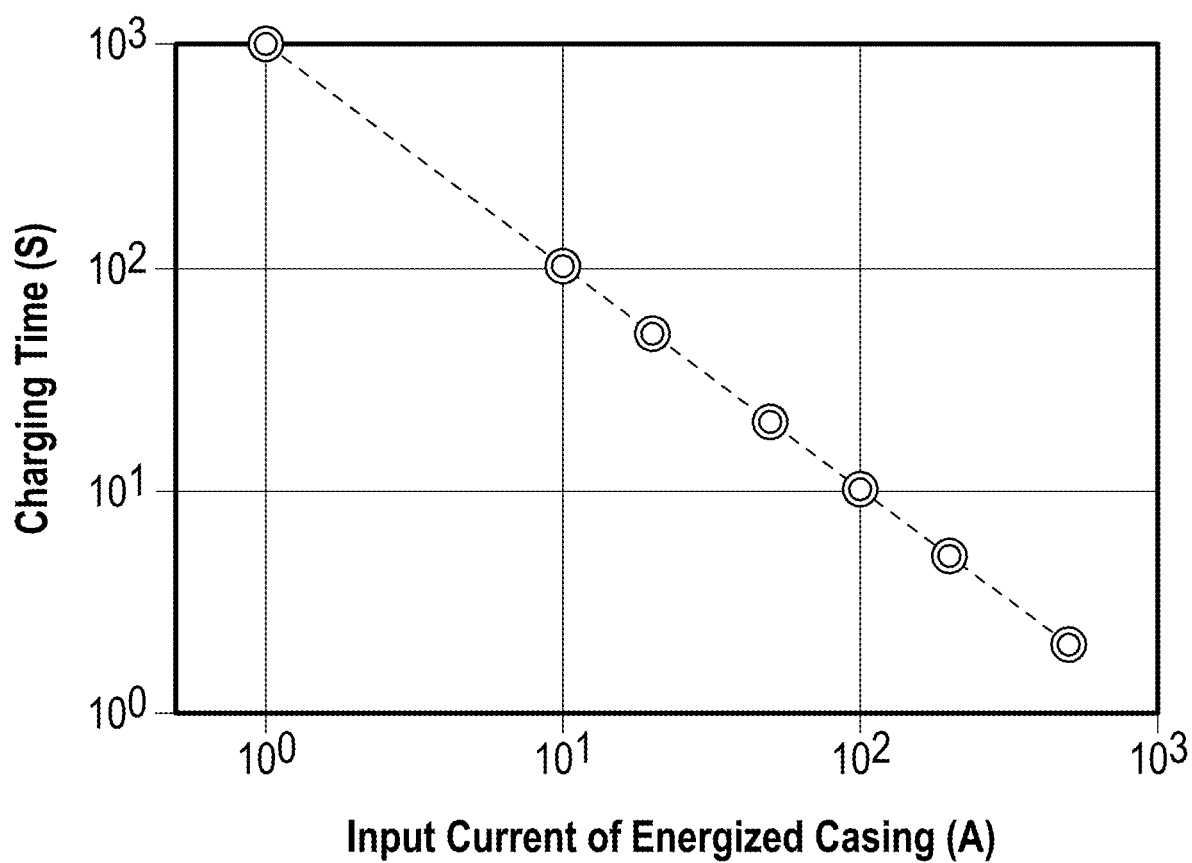
FIG. 12 is a graph of the estimated charging time to upload 100-bytes data with different magnitudes of injected current in accordance with aspects of the present disclosure.

FIG. 12 shows a graph indicating the predicted charging time for a telemetry system after uploading 100-bytes data to the surface. In this numerical example, the surrounding formation is about 10 ohm-m, and the frequency of casing current is about 500 Hz. No relay segments are used. For example, the transceivers are made of ferrite of high permittivity ($\mu r=10,000$) and with about 20 turns of coils. As long as the selected energy harvesting devices are resistant to high pressure, high temperature, and a low-pH environment, the wireless power transfer system can run for long-time monitoring of the well.

Figure 13:
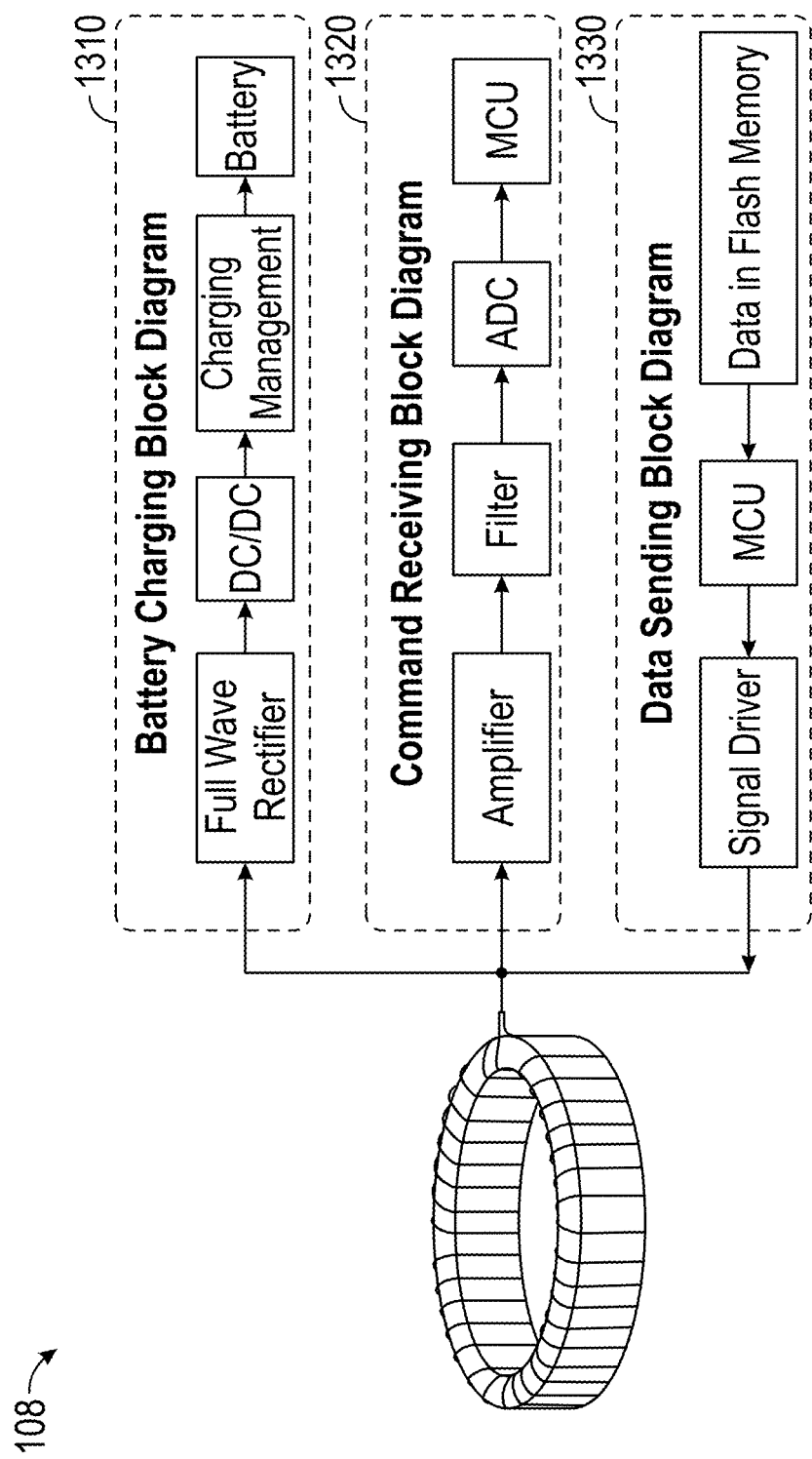
FIG. 13 is a hardware block diagram of telemetry and wireless charging system in accordance with aspects of the present disclosure.

FIG. 13 shows a hardware block diagram of telemetry and wireless charging. The circuit is divided into three parts: command receiving module 1320, data sending module 1330, and battery charging module 1310. In order to greatly reduce the power consumption of the circuit, the components should be of small size, low power, and high-temperature resistance.

Figure 14:
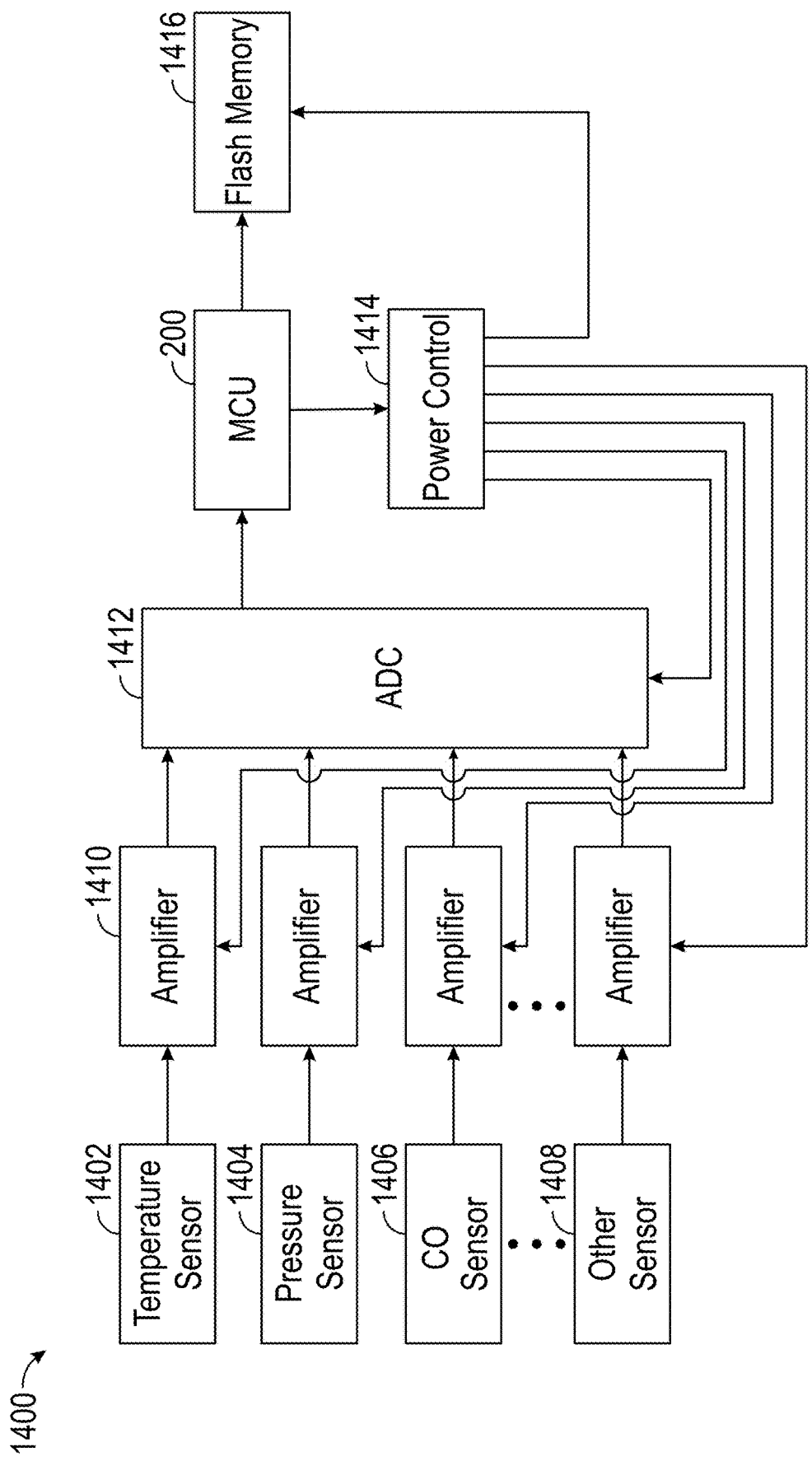
FIG. 14 is a hardware block diagram of the downhole signal acquisition system of FIG. 2 in accordance with aspects of the present disclosure.

FIG. 14 shows a hardware block diagram of downhole signal acquisition. Data is captured from sensors such as a temperature sensor 1402, a pressure sensor 1404, a $CO_2$ sensor 1406, and/or other sensors 1408, processed by amplifiers 1420 and digitized via the A/D converter 1412 for further processing. A function of downhole signal acquisition assembly is to collect downhole temperature, pressure, $CO_2$ concentration, and/or other information and record them in flash memory 1416. By reducing the sampling frequency (such as 1 time/day), the power consumption of the system can be greatly reduced to ensure the longest possible working time. It is contemplated that to further reduce the power consumption of the system, the MCU in FIG. 14 and the MCU in FIG. 13 can be the same controller 200.

Figure 15:
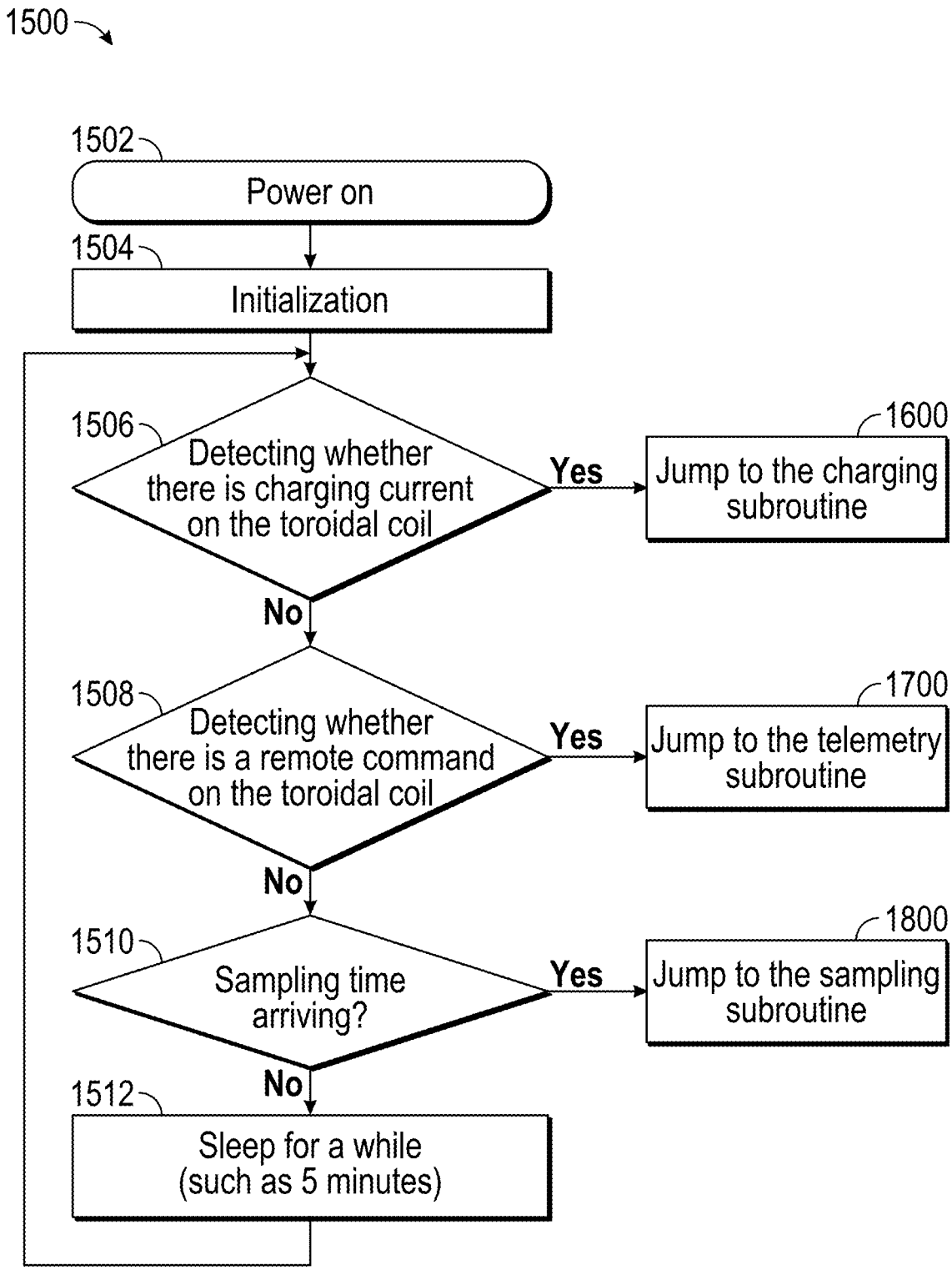
FIG. 15 is a software flow diagram in accordance with aspects of the present disclosure.

FIG. 15 is the main software flow chart of the MCU. Initially, the wireless telemetry system 10 is powered on at step 1502. At step 1504, the wireless telemetry system 10 will be initialized after power on.

Figure 16:
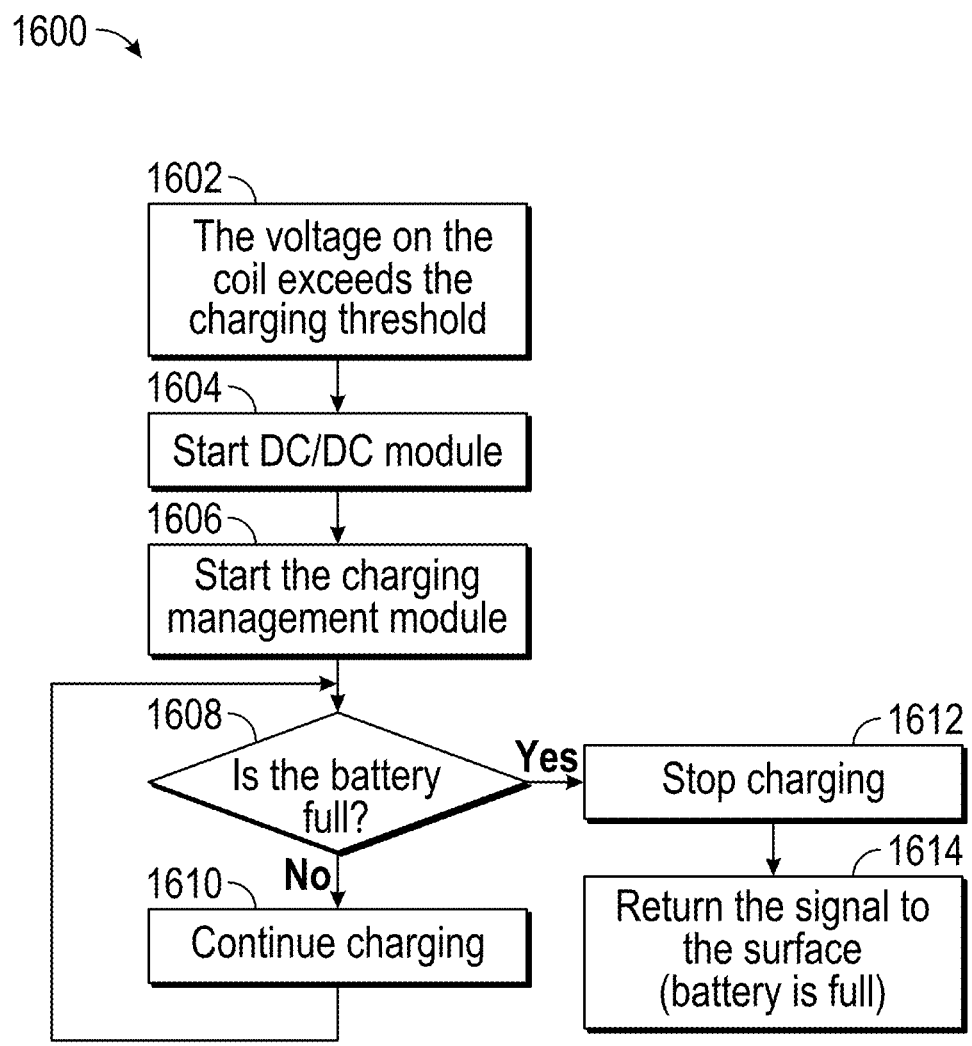
FIG. 16 is a charging subroutine flow diagram in accordance with aspects of the present disclosure.

At step 1506, the controller 200 determines whether there is a charging current on the toroidal antenna 108 (FIG. 2). If the controller 200 determines there is a charging current, then the controller 200 jumps to the charging subroutine 1600 (FIG. 16).

Figure 17:
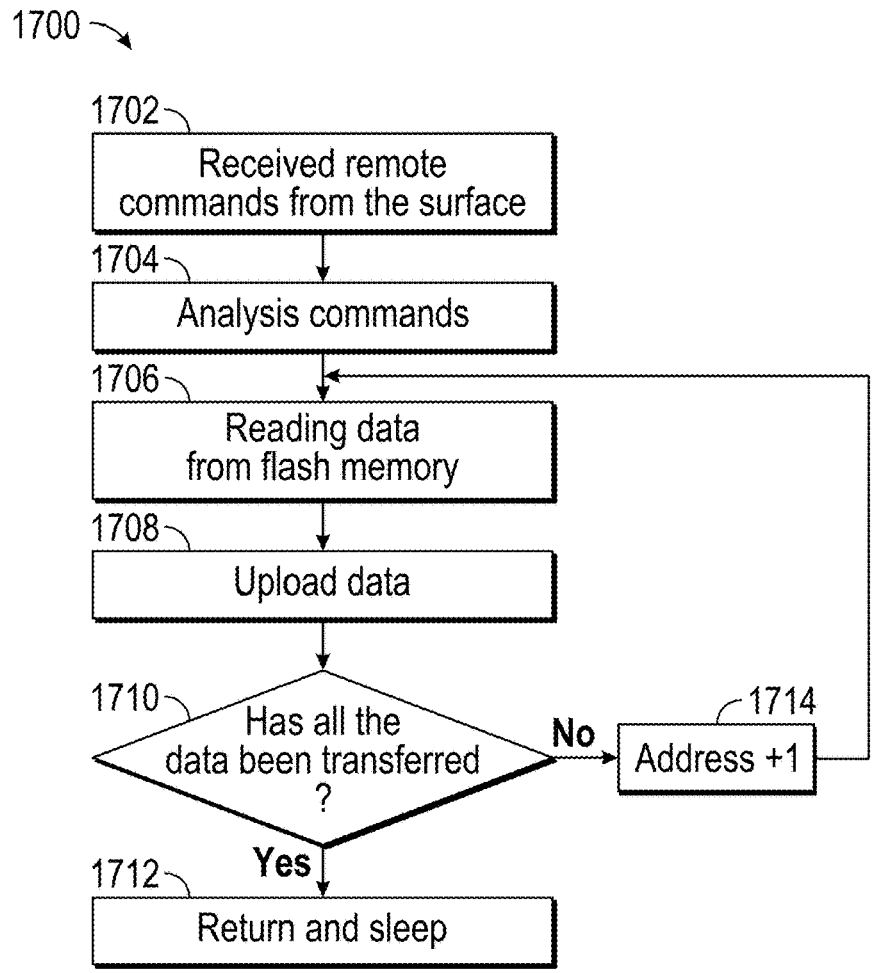
FIG. 17 is a telemetry subroutine flow diagram in accordance with aspects of the present disclosure.

At step 1508, the controller 200 determines whether there is a remote command from the ground. If the controller 200 determines there is a remote command, then the controller 200 jumps to the telemetry subroutine 1700 (FIG. 17).

Figure 18:
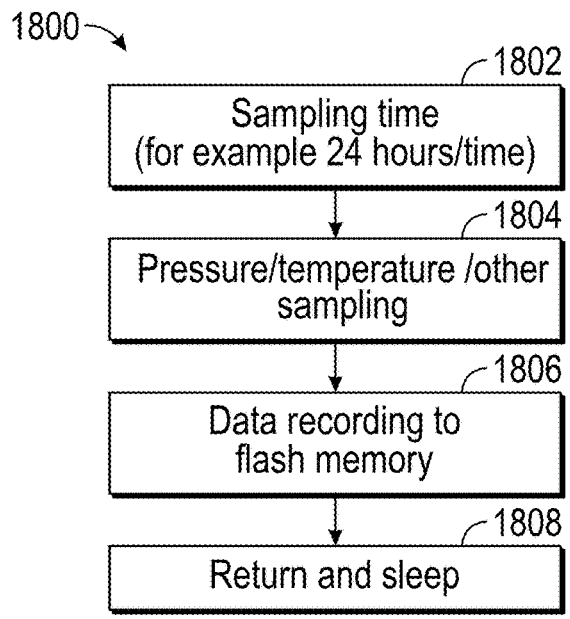
FIG. 18 is a downhole signal acquisition subroutine flow diagram in accordance with the aspects of present disclosure.

At step 1510, the controller 200 determines whether the predetermined sampling time has elapsed, for example, about 24 hours. If the controller 200 determines that the predetermined sampling time has elapsed, then the controller 200 jumps to the downhole signal acquisition subroutine 1800 (FIG. 18).

If the above conditions are not met (e.g., steps 1502, 1504, 1506), the wireless telemetry system 10 may enter a sleep state. The system state will be checked again after a period of time, for example, about 24 hours. This approach allows the wireless telemetry system 10 to remain dormant for most of the time, which greatly saves electricity.

FIG. 16 shows a charging subroutine 1600 flow diagram. At step 1602, the controller 200 determines if the voltage on the coil exceeds the charging threshold. At step 1604, the controller 200 starts the DC/DC module. At step 1606, the controller 200 starts the charging management module 1310 (FIG. 13). At step, 1608 the controller 200 determines if the battery is full. If the battery is full (e.g., charged above a predetermined threshold), then at step 1612, the controller 200 stops charging the battery, and at step 1616, the controller 200 sends a signal to the surface indicating that the battery is full. If the battery is not full (e.g., charged below a predetermined threshold), then at step 1610, the controller 200 continues charging the battery.

FIG. 17 shows a telemetry subroutine 1700 flow diagram. Initially, at step 1702, the controller 200 receives remote commands from the surface. At step 1704, the controller performs analysis of the commands using the command receiving module 1320 (FIG. 13). At step 1706, the controller reads data from memory. For example, the memory may include flash memory or other suitable types of memory. At step 1708, the controller uploads the data from the memory to the surface via the data sending module 1330 (FIG. 13). At step 1710, the controller 200 determines if all of the data has been uploaded (e.g., transferred) to the surface. If all of the data has not been uploaded, then at step 1714, the controller 200 increments through the various memory locations and uploads the remaining data. If all of the data has been uploaded, then at step 1712, the controller 200 sets the system state to sleep.

FIG. 18 shows a downhole signal acquisition subroutine flow 1800 diagram.

Initially, at step 1802, the controller 200 determines if the predetermined sampling time has elapsed, for example, about 24 hours. If the predetermined sampling time has elapsed, then at step 1804, the controller 200 captures data from the various sensors (e.g., 1402-1408 of FIG. 14). At step 1806, the sensor data is stored in memory. At step 1808, after the sensor data is recorded into memory, the controller 200 may put the wireless telemetry system 10 in a sleep state.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The phrases "in an embodiment," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

What is claimed is:

1. A system for wireless transmission of power in deep subsurface monitoring, the system comprising:
   a casing including a conductive material;
   an oscillating current source configured to energize the casing; and
   at least one wireless telemetry module disposed on the casing, the wireless telemetry module including:
   a shell;
   a toroidal antenna disposed within the shell, the toroidal antenna configured to collect electrical energy from an energized casing, wherein the toroidal antenna includes a winding of loops of conductive wire around a ring of material with a high value of magnetic permeability, wherein the material includes mu-metal;
   a battery pack disposed within the shell, configured to store the collected electrical energy;
   a $CO_2$ sensor configured to generate a signal indicative of a $CO_2$ concentration; and
   an amplifier configured to process the signal from the $CO_2$ sensor; and
   a voltmeter, including a first terminal and a second terminal, wherein the first terminal is connected to the casing and the second terminal is connected to the toroidal antenna,
   wherein the at least one wireless telemetry module is located in a $CO_2$ reservoir.

2. The system of claim 1, wherein the at least one wireless telemetry module is located in a subsurface.

3. The system of claim 1, wherein the battery pack includes supercapacitors.

4. The system of claim 1, wherein the wireless telemetry module further includes a telemetry transceiver control module configured to generate a binary code to drive the antenna.

5. The system of claim 1, further comprising at least one of a temperature sensor or a pressure sensor.

6. The system of claim 5, wherein the wireless telemetry module further includes a downhole signal acquisition assembly disposed within the shell,
   wherein the downhole signal acquisition assembly is configured to acquire a signal from at least one of the temperature sensor, the pressure sensor, or the $CO_2$ sensor.

7. The system of claim 6, wherein the downhole signal acquisition unit configured to collect at least one of downhole temperature, pressure, or $CO_2$ concentration.

8. A method for wireless transmission of power, the method comprising:
   energizing a casing;
   obtaining, by a toroidal antenna of at least one wireless telemetry module disposed on the casing, an electrical energy from an energized casing, wherein the toroidal antenna includes a winding of loops of conductive wire around a ring of material with a high value of magnetic permeability, wherein the material includes mu-metal;
   determining whether there is an electrical charge on the antenna;
   charging a battery pack using the obtained electrical energy, based on the determined electrical charge;
   generating a signal by a $CO_2$ sensor indicative of a $CO_2$ concentration; and
   detecting the signal using a voltmeter, the voltmeter including a first terminal and a second terminal, wherein the first terminal is connected to the casing and the second terminal is connected to the toroidal antenna,
   wherein the at least one wireless telemetry module is located in a $CO_2$ reservoir.

9. The method of claim 8, wherein the at least one wireless telemetry module includes at least one of a temperature sensor or a pressure sensor.

10. The method of claim 9, further comprising collecting at least one of downhole temperature, pressure, or $CO_2$ concentration based on at least one of the temperature sensor, the pressure sensor, or the $CO_2$ sensor.

11. The method of claim 8, further comprising:
determining if the battery pack is fully charged; and
wirelessly transmitting a signal indicating that the battery pack is fully charged based on the determination.

12. The method of claim 8, wherein the energizing is based on an oscillating current source.

13. The method of claim 8, wherein the at least one wireless telemetry module is located in a subsurface.

14. The method of claim 8, wherein the battery pack includes supercapacitors.

15. The method of claim 8, further comprising generating a binary code to drive the antenna.

16. A system for wireless transmission of power in deep subsurface monitoring, the system comprising:
- a casing including a conductive material;
- an oscillating current source configured to energize the casing; and
- a wireless telemetry module located in a $CO_2$ reservoir, the wireless telemetry module including:
  - a toroidal antenna, wherein the toroidal antenna includes a winding of loops of conductive wire around a ring of material with a high value of magnetic permeability, wherein the material includes mu-metal;
  - a battery pack;
  - a $CO_2$ sensor configured to generate a signal indicative of a $CO_2$ concentration;
  - an amplifier configured to process the signal from the $CO_2$ sensor;
  - a processor; and
  - a memory, including instructions stored thereon, which when executed by the processor cause the system to:
    - energize the casing;
    - obtain, by the antenna, an electrical energy from an energized casing;
    - determine whether there is an electrical charge on the antenna; and
    - based on the determination, charge the battery pack using the obtained electrical energy; and
  - a voltmeter, including a first terminal and a second terminal, wherein the first terminal is connected to the casing and the second terminal is connected to the toroidal antenna.

\* \* \* \* \*